(12) United States Patent
Satoh

(10) Patent No.: US 7,102,661 B2
(45) Date of Patent: Sep. 5, 2006

(54) POSITIONAL CORRECTION FOR APPARATUS HAVING A PLURALITY OF DRAWING SYSTEMS

(75) Inventor: Nobuyuki Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 218 days.

(21) Appl. No.: 10/667,305

(22) Filed: Sep. 23, 2003

(65) Prior Publication Data

US 2004/0125195 A1 Jul. 1, 2004

(30) Foreign Application Priority Data

Sep. 24, 2002 (JP) ............................. 2002-276559

(51) Int. Cl.
B41J 2/435 (2006.01)
(52) U.S. Cl. ...................... 347/234; 347/248
(58) Field of Classification Search ........ 347/116–117, 347/233–235, 240, 251–254, 19, 248–250; 356/603–605, 618–620, 242; 399/72, 301, 399/394–396; 355/41
See application file for complete search history.

(56) References Cited

U.S. PATENT DOCUMENTS

| | | | |
|---|---|---|---|
| 4,760,427 A | 7/1988 | Oyama et al. | 355/32 |
| 4,866,478 A | 9/1989 | Kasahara et al. | 355/70 |
| 5,587,813 A | 12/1996 | Yamazaki et al. | 358/500 |
| 5,867,759 A | 2/1999 | Isobe et al. | 399/301 |
| 5,946,537 A * | 8/1999 | Nakayasu et al. | 399/301 |
| 6,160,610 A * | 12/2000 | Toda | 355/41 |
| 6,181,363 B1 | 1/2001 | Satoh | 347/238 |
| 6,310,637 B1 * | 10/2001 | Shimada et al. | 347/19 |
| 6,714,748 B1 * | 3/2004 | Nakayasu et al. | 399/72 |

FOREIGN PATENT DOCUMENTS

| JP | 07318314 A | * 12/1995 |
|---|---|---|
| JP | 10115955 A | * 5/1998 |
| JP | 2000-187171 | 7/2000 |
| JP | 2000-267027 | 9/2000 |

OTHER PUBLICATIONS

U.S. Appl. No. 10/278,916, filed Oct. 24, 2002, Suzuki et al.
U.S. Appl. No. 10/667,305, filed Sep. 23, 2003, Satoh.
U.S. Appl. No. 10/831,289, filed Apr. 26, 2004, Satoh et al.

* cited by examiner

Primary Examiner—Hai Pham
(74) Attorney, Agent, or Firm—Oblon, Spivak, McClelland, Maier & Neustadt, P.C.

(57) ABSTRACT

An apparatus for forming an image by use of a plurality of light beams, which are simultaneously modulated according to image signals and joined together on a photoconductive surface to form the image. The apparatus includes a photoconductive drum having a photoconductive surface and a reference mark, a pattern supplying unit which supplies image data in synchronization with a detection of the reference mark associated with a rotation of the photoconductive drum, and drawing systems which (i) create moiré stripes on the photoconductive surface by simultaneously drawing overlapping sets of slanted lines with the respective light beams according to the image data, and (ii) draw a reference position mark alongside the moiré stripes on the photoconductive surface according to the image data.

16 Claims, 14 Drawing Sheets

POSITIONAL CORRECTION FOR APPARATUS HAVING A PLURALITY OF DRAWING SYSTEMS

BACKGROUND OF THE INVENTION

1. Field of the Invention

The present invention generally relates to image forming apparatuses which join a plurality of light beams together on a photoconductive drum where the light beams are modulated independently of each other by image signals, and particularly relates to an image forming apparatus which detects and corrects the position of the light beams where drawing starts

2. Description of the Related Art

Japanese Patent Application Publication No. 2000-187171 discloses a technology that achieves a compact-size optical scan system having a wide scanning span by controlling two drawing systems with one deflection means and by joining the two drawing systems together. This technology provides two sets of drawing systems, a single deflection means shared by the two drawing systems. Two beams are guided to different deflection surfaces of the deflection means for deflection in respective directions. The two beams are then directed to the same scan surface, thereby scanning the scan surface by dividing a single scan area on the scan surface into respective halves. It is also disclosed that the two scan beams are swept in opposite directions from a seam where the two scan lines join together toward the opposite ends.

Japanese Patent Application Publication No. 2000-267027 discloses an image forming apparatus based on an optical scanning unit that uses two beams simultaneously deflected by the same deflection means, and scans a scan area on the scan surface by dividing the scan area by half in the main scan direction.

According to this technology, a single polygon is used for the scanning of two drawing systems to start beam scans from around the center of an image, and joins the beams together in the main scan direction. This achieves a compact-size drawing system providing a wide span at a low cost. A crossing point detecting means (one dimensional CCD) for detecting a beam crossing position in the sub-scan direction is provided to detect the positional error of a scan line in the sub-scan direction caused by temperature variation (which occurs due to a minute displacement of a beam path attributable to the thermal expansion of the housing and/or the lens system). The error is then corrected to achieve satisfactory precision of a positional setting in the sub-scan direction, thereby suppressing an error in the sub-scan direction along the seam line.

Japanese Patent Application Publication No. 2000-187171 described above teaches a basic technology regarding an apparatus using two scan beams and a single deflection means. No measure, however, is taken to cope with a displacement in the main scan direction at a seam where the two scan beams join together.

Japanese Patent Application Publication No. 2000-267027 described above takes into account the correction of error in the sub-scan direction at a seam where two scan beams join together. No consideration, however, is given to the correction of error in the main scan direction.

Along the seam, error in the main scan direction has a detrimental effect on an image. An error of ½ dot, for example, will appear as a white streak in a halftone image. A dot pitch is 42.3 micrometers in a 600-dpi image, for example, so that a tolerable dot error would be about 21 micrometers. Since two optical systems join together, a tolerable error of each optical system is 10 micrometer, which is half of 21 micrometers.

Factors that cause error in the main scan direction include:
1) signal delay caused by temperature characteristics of a synchronization detecting sensor;
2) variation in magnification factors of lens systems caused by a temperature rise;
3) a change in a distance relative to the photoconductive surface due to a temperature rise of machinery;
4) a change in a distance relative to the photoconductive surface caused by eccentricity that appears during rotation of the photoconductive drum.

Errors in the main scan direction were measured to be 60 micrometers in the case of 1), 20 micrometers in the case of 2), 10 micrometers in the case of 3), and 70 micrometers in the case of 4) (when the eccentricity is 100 micrometers). In total, an error of 160 micrometers was generated.

The assignee of this application has already addressed the detection and correction of respective errors in the cases of 1) through 3). With respect to error in the case of 4), the assignee of this application has also proposed measuring the eccentricity of a photoconductive drum by mechanical means and correcting error based on the measured eccentricity.

There is a need for a new scheme that detects and corrects a positional error in the main scan direction at a low cost where such an error is caused by the eccentricity of a photoconductive drum along the seam where beams of the two optical systems join together.

SUMMARY OF THE INVENTION

It is a general object of the present invention to provide an image forming apparatus and an apparatus for adjusting position of light beams that substantially obviate one or more problems caused by the limitations and disadvantages of the related art.

It is another and more specific object of the invention to provide an image forming apparatus and an apparatus for adjusting position of light beams that detect and correct a positional error in the main scan direction at a low cost where such an error is caused by the eccentricity of a photoconductive drum along the seam where beams of the two or more optical systems join together.

In order to achieve the above object according to the invention, an apparatus for forming an image by use of a plurality of light beams, which are simultaneously modulated according to image signals and joined together on a photoconductive surface to form the image, includes a photoconductive drum having the photoconductive surface and a reference mark, a pattern supplying unit which supplies image data in synchronization with detection of the reference mark associated with rotation of the photoconductive drum, and drawing systems which create moiré stripes on the photoconductive surface by simultaneously drawing overlapping sets of slanted lines with the respective light beams according to the image data, and draw a reference position mark on the photoconductive surface according to the image data.

According to another aspect of the invention, the apparatus further includes a computing unit which computes an amount of correction of position of the light beams on the photoconductive surface in a main scan direction in response to comparison between position of the moiré stripes and position of the reference position mark, the main scan direction being substantially parallel to an axis of the photoconductive drum.

According to another aspect of the invention, the apparatus further includes a circuit which adjusts position of the light beams on the photoconductive surface in a main scan direction according to comparison between position of the moiré stripes and position of the reference position mark, the main scan direction being substantially parallel to an axis of the photoconductive drum.

According to another aspect of the invention, the apparatus further includes a sensor which detects the position of the moiré stripes.

According to another aspect of the invention, the computing unit computes the amount of correction of position of the light beams by interpolating data that are obtained for at least three positions along a circumference of the photoconductive drum.

According to another aspect of the invention, the comparison is made either on the photoconductive surface or on a sheet of paper on which a toner image of the moiré stripes and the reference position mark is created.

According to another aspect of the invention, the drawing systems include a first drawing system which uses a first one of the light beams to draw a first set of lines slanted at a predetermined angle, and a second drawing system which uses a second one of the light beams to draw a second set of lines slanted at an angle opposite to the predetermined angle, the first set of lines and the second set of lines having an identical line pitch and an identical line width.

According to another aspect of the invention, an apparatus for adjusting position of a plurality of light beams, which are simultaneously modulated according to image signals and joined together on a photoconductive surface to form an image, includes a photoconductive drum having the photoconductive surface and a reference mark, a pattern supplying unit which supplies image data in synchronization with detection of the reference mark associated with rotation of the photoconductive drum, drawing systems which create moiré stripes on the photoconductive surface by simultaneously drawing overlapping sets of slanted lines with the respective light beams according to the image data, and draw a reference position mark on the photoconductive surface according to the image data, and a circuit which adjusts position of the light beams on the photoconductive surface in a main scan direction according to comparison between position of the moiré stripes and position of the reference position mark, the main scan direction being substantially parallel to an axis of the photoconductive drum.

According to another aspect of the invention, an apparatus for forming an image by use of a plurality of light beams, which are simultaneously modulated according to image signals and joined together on a photoconductive drum to form the image, includes means for forming a reference position mark on the photoconductive drum, and means for forming moiré stripes on the photoconductive drum by simultaneously drawing overlapping sets of slanted lines with the respective light beams.

According to another aspect of the invention, the apparatus further includes computing means for computing an amount of correction of position of the light beams on the photoconductive drum in a main scan direction in response to comparison between position of the moiré stripes and position of the reference position mark, the main scan direction being substantially parallel to an axis of the photoconductive drum.

According to another aspect of the invention, the apparatus further includes means for adjusting position of the light beams on the photoconductive drum in a main scan direction according to comparison between position of the moiré stripes and position of the reference position mark, the main scan direction being substantially parallel to an axis of the photoconductive drum.

According to another aspect of the invention, the apparatus further includes means for detecting the position of the moiré stripes.

According to another aspect of the invention, the computing means computes the amount of correction of position of the light beams by interpolating data that are obtained for at least three positions along a circumference of the photoconductive drum.

According to another aspect of the invention, the comparison is made either on the photoconductive surface or on a sheet of paper on which a toner image of the moiré stripes and the reference position mark is created.

According to another aspect of the invention, the means for forming moiré stripes include a first drawing system which uses a first one of the light beams to draw a first set of lines slanted at a predetermined angle, and a second drawing system which uses a second one of the light beams to draw a second set of lines slanted at an angle opposite to the predetermined angle, the first set of lines and the second set of lines having an identical line pitch and an identical line width.

According to another aspect of the invention, an apparatus for adjusting position of a plurality of light beams, which are simultaneously modulated according to image signals and joined together on a photoconductive drum to form an image, includes means for forming a reference position mark on the photoconductive drum, means for forming moiré stripes on the photoconductive drum by simultaneously drawing overlapping sets of slanted lines with the respective light beams, and means for adjusting position of the light beams on the photoconductive drum in a main scan direction according to comparison between position of the moiré stripes and position of the reference position mark, the main scan direction being substantially parallel to an axis of the photoconductive drum.

With the provision described above, the invention provides for the eccentricity of a photoconductive drum to be accurately measured by use of an eccentricity measuring pattern formed on the photoconductive surface without requiring a manufacturing step for measuring the eccentricity of the photoconductive drum. (In the conventional art, such a manufacturing step for measuring an eccentricity was necessary.) Further, the invention insures that the eccentricity of a photoconductive drum is accurately measured even if photoconductive drums are exchanged.

The eccentricity measuring pattern is comprised of overlapping sets of slanted lines, which generate moiré stripes. This makes it possible to measure the eccentricity of the photoconductive drum in an expanded scale, thereby ensuring the highly accurate measurement of eccentricity.

The eccentricity may be obtained by visual inspection or manual measurement of the eccentricity measuring pattern transferred onto a sheet of paper. The obtained eccentricity data is then used for correction of beam positions by entering the data into the apparatus through an operation panel or the like. This ensures proper positional correction in the main scan direction even if photoconductive drums are exchanged.

Further, the eccentricity measuring pattern formed on the photoconductive drum may be measured by the sensor. This provides for automatic measurement of an eccentricity without a need for outputting the pattern on a sheet of paper for visual inspection, thereby eliminating a need for excess manual labor. It suffices for the sensor to detect the density of the eccentricity measuring pattern, so that the eccentricity can be measured at a lower cost, compared with when a distance is directly measured by an optical or mechanical displacement gauge.

Further, the invention provides for a few representative points along the circumference of the photoconductive drum to be used for interpolation of eccentricity data at other positions. This helps to reduce memory size and thereby a cost.

Other objects and further features of the present invention will be apparent from the following detailed description when read in conjunction with the accompanying drawings.

DESCRIPTION OF THE PREFERRED EMBODIMENTS

In the following, a description will be given of embodiments of the invention with reference to the accompanying drawings. These embodiments are directed to an apparatus for aligning the start position of light beams where drawing begins and an image forming apparatus based on such aligning apparatus.

Figure 1:
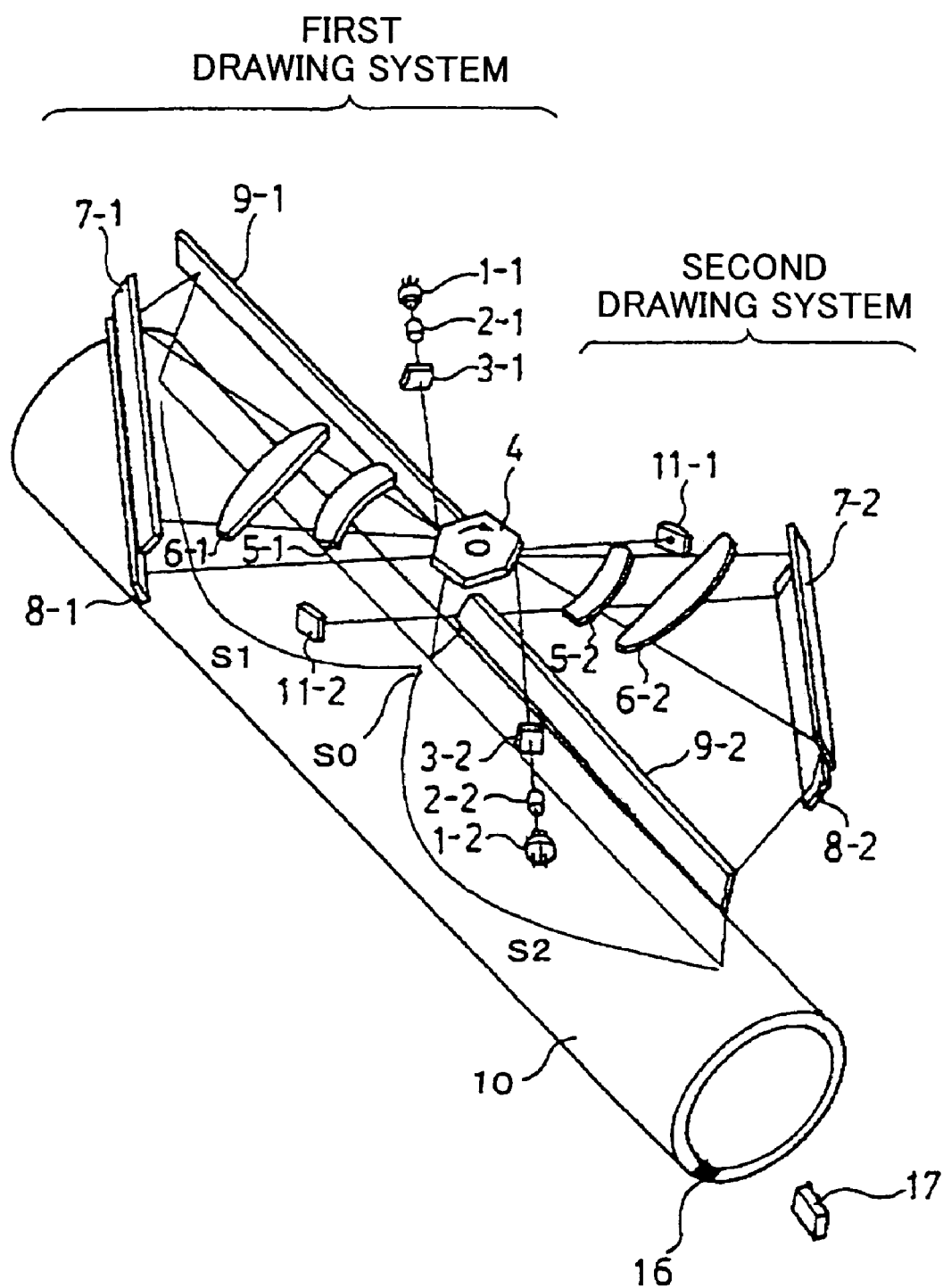
FIG. 1 is an illustrative drawing showing the construction of an optical scan apparatus for scanning a scan area with two light beams by dividing the scan area into halves in a main scan direction according to an embodiment of the invention.

FIG. 1 is an illustrative drawing showing the construction of a optical scan apparatus for scanning a scan area on the scan surface with two light beams by dividing the scan area into halves in the main scan direction according to an embodiment of the invention. The construction of this optical scan apparatus will be described with reference FIG. 1. As shown in FIG. 1, the optical scan apparatus includes a first drawing system and a second drawing system.

The first drawing system will be described first. A semiconductor laser 1-1 serving as a light source emits a laser beam having its intensity modulated according to image signals. The light beam is turned into a parallel beam by the collimator function of a coupling lens 2-1. A cylinder lens 3-1 converges the light beam only in the sub-scan direction, thereby forming an elongated line image on or near the deflective reflection surface of a polygon mirror 4, which serves as a deflection means. The rotation of the polygon mirror 4 deflects the beam at constant angular velocity, and the deflected beam passes through lenses 5-1 and 6-1 forming an fθ lens serving as an image forming means. Mirrors 7-1, 8-1, and 9-1 successively reflect the beam, resulting in a beam spot being formed on the photoconductive surface (scan surface) of a photoconductive drum 10. The beam scans a first scan area S1 on the photoconductive drum 10 at constant speed.

The second drawing system is arranged in a position that is provided by rotating the first drawing system 180 degrees around the rotation axis of the polygon mirror 4. A semiconductor laser 1-2 serving as a light source emits a laser beam having its intensity modulated according to image signals. The light beam is turned into a parallel beam by a coupling lens 2-2. A cylinder lens 3-2 converges the light beam only in the sub-scan direction, thereby forming an elongated line image on or near another deflective reflection surface of the polygon mirror 4. The rotation of the polygon mirror 4 deflects the beam at constant angular velocity, and the deflected beam passes through lenses 5-2 and 6-2 forming an fθ lens serving as an image forming means. Mirrors 7-2, 8-2, and 9-2 successively reflect the beam, resulting in a beam spot being formed on the photoconductive surface of the photoconductive drum 10. The beam scans a second scan area S2 on the photoconductive drum 10 at constant speed.

The first drawing system and the second drawing system are optical equivalents. The first and second drawing systems draw images in opposite directions from a center portion S0 to the opposite ends of the scan areas. The center portion S0 is a center of all the scan areas and positioned at a joint point between the first scan area S1 and the second scan area S2. The first and second drawing systems include synchronization detecting units 11-1 and 11-2, respectively. The synchronization detecting units 11-1 and 11-2 are situated outside the imaging areas of respective scan beams, and determine, at every scan, the timing at which each scan beam starts scanning.

A drawing control circuit (not shown) starts drawing from a drawing start position (i.e., the center portion S0 described above) at the determined timing. In this manner, each scan beam has the drawing start position S0 in common, and is properly controlled by the drawing control circuit. The scan beams can thus be aligned well with ease at the seam portion in the main scan direction.

The first scan area S1 and the second scan area S2 should be joined together to form a single straight line. In design, such a straight line is fixedly arranged in the machinery space. The ideal scan line fixedly arranged in the machinery space should be traced by two beams simultaneously on the scan surface, and is considered to be a scan surface axis. Namely, the first and second scan areas S1 and S2 should ideally match the scan surface axis, and join together at the center portion S0.

Figure 2A:
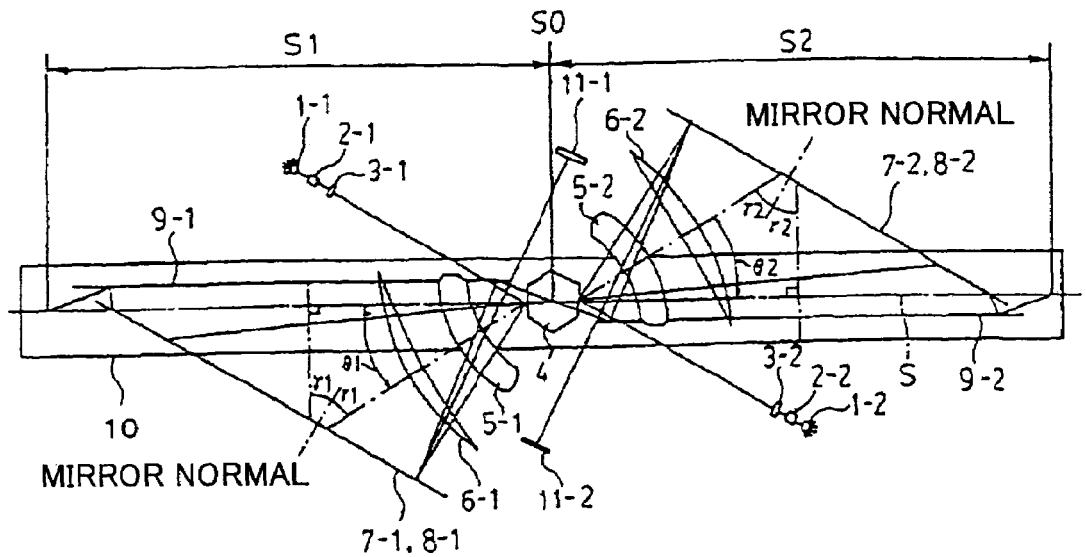
FIG. 2A is a view of the optical scan apparatus of FIG. 1 taken from a distanced viewpoint on the rotation axis of a polygon mirror.
Figure 2B:
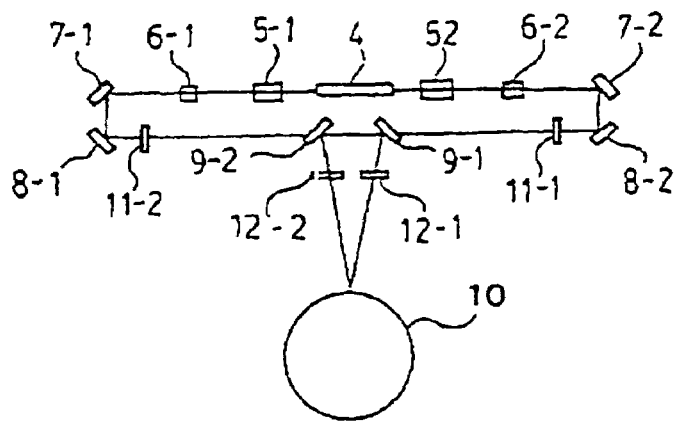
FIG. 2B is a view of the optical scan apparatus taken from a distanced viewpoint on the axis of a photoconductive drum.
Figure 2C:
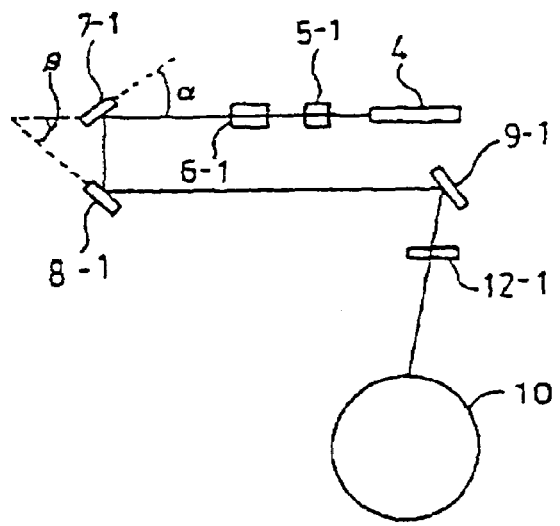
FIG. 2C is an illustrative drawing showing one of the two light beam paths shown in FIG. 2B.

FIG. 2A is a view of the optical scan apparatus of FIG. 1 taken from a distanced viewpoint on the rotation axis of the polygon mirror 4. The beam deflection plane is parallel to the drawing sheet that bears FIG. 2A. FIG. 2B is a view of the optical scan apparatus taken from a distanced viewpoint on the axis of the photoconductive drum 10 that provides the scan surface. Although not shown in FIG. 2B, the optical scan apparatus is sealed inside an optical box in order to ward off dust and the like, and is fixedly set with high precision. In FIG. 2B, reference numerals 12-1 and 12-2 indicate dustproof glass that seals of the openings of the optical box through which beams are emitted. FIG. 2C is an illustrative drawing showing one of the two light beam paths shown in FIG. 2B. As shown in FIG. 2C, the mirrors 7-1 and 8-1 of the first drawing system are arranged such as to overlap each other in the sub-scan direction (i.e., the vertical direction in the drawing).

An angle of the mirrors 7-1 and 8-1 relative to the beam deflection plane is $\alpha$ and $\beta$, respectively (here, an angle is measured from the beam deflection plane, and is plus in the clockwise direction and minus in the counterclockwise direction. The angles $\alpha$ and $\beta$ are related as: $|\alpha-\beta|=90$ degrees. That is, the mirrors 7-1 and 8-1 together form a DAHA mirror. The deflected beam successively reflected by the mirrors 7-1 and 8-1 sweeps a surface that is parallel to the beam deflection plane. The mirrors 7-2 and 8-2 of the second drawing system are configured in the same manner.

In order to have the first and second drawing systems scan a common scan line (i.e., the scan surface axis), generally, the optical axis of the first and second drawing systems needs to be set at a right angle to the scan surface axis (which is parallel to the axis of the photoconductive drum 10), and the length of an optical path of the image forming means should be the same for both of the drawing systems. With this provision, a constant beam-spot size is achieved, and a proper scan is attained, resulting in high quality images.

Figure 3:
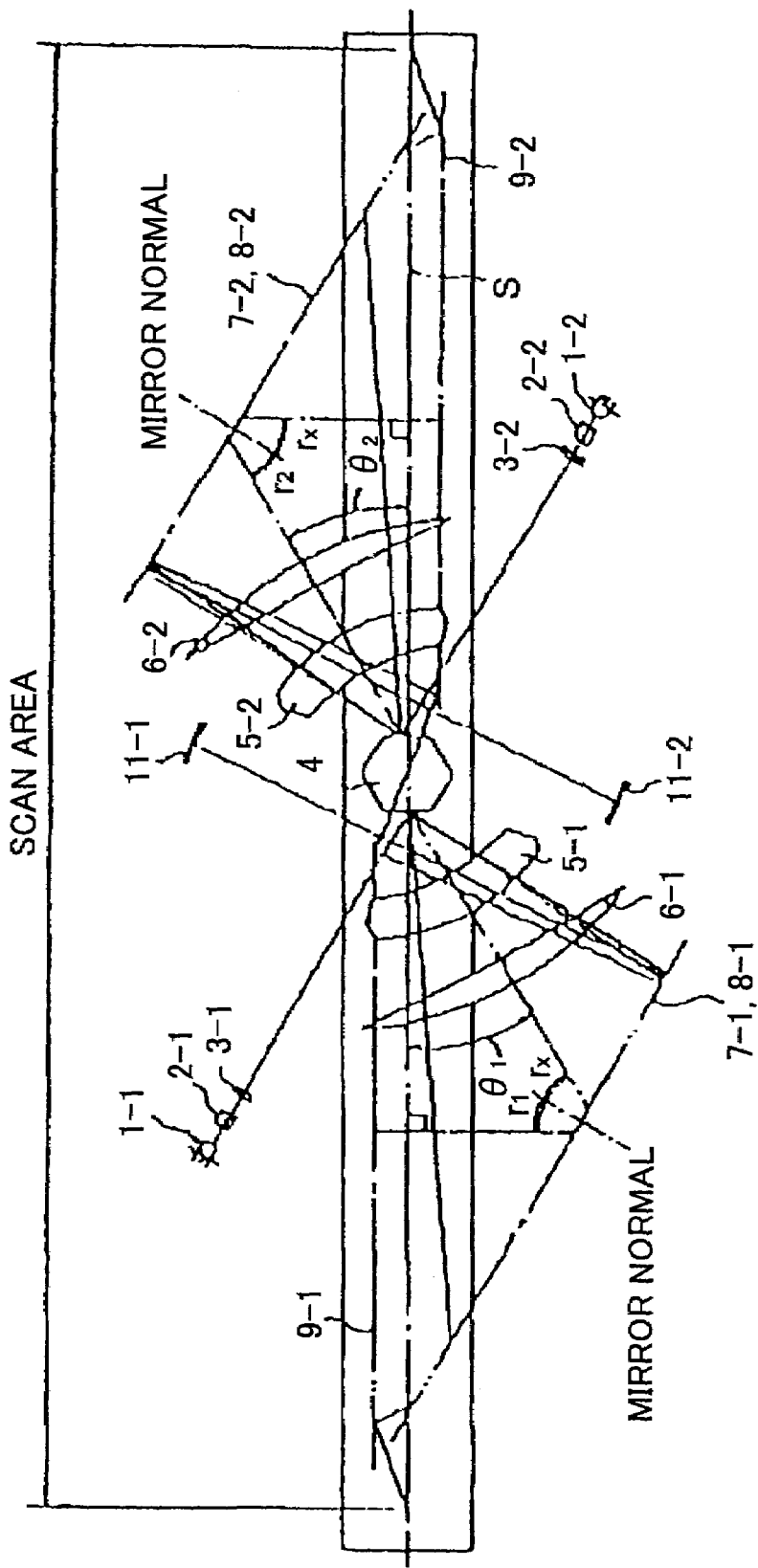
FIG. 3 is an illustrative drawing showing the optical system of the optical scan apparatus.

In the example described above, the image forming means is comprised of an fθ lens. As shown in FIG. 3, the optical axis of the fθ lens comprised of the lenses 5-1 and 6-1 is at an angle $\theta 1$ relative to the scan surface axis S, and the optical axis of the fθ lens comprised of the lenses 5-2 and 6-2 is at an angle $\theta 2$ relative to the scan surface axis S. In order to adjust the optical axis of each fθ lens at a right angle to the scan surface axis S, two mirrors, i.e., the mirrors 7-1 and 8-1 in the first drawing system and the mirrors 7-2 and 8-2 in the second drawing system, are provided.

In the first drawing system, the optical axis of the fθ lens is at an angle $\gamma 1$ relative to the mirror 7-1 in the beam deflection plane. The angle $\gamma 1$ and the angle $\theta 1$ at which the optical axis crosses the scan surface axis S are related as:

$|\theta 1|+2|\gamma 1|=90$ degrees.

In the second drawing system, the optical axis of the fθ lens is at an angle $\gamma 2$ relative to the mirror 7-2 in the beam deflection plane. The angle $\gamma 2$ and the angle $\theta 2$ at which the optical axis crosses the scan surface axis S are related as:

$|\theta 2|+2|\gamma 2|=90$ degrees.

In this manner, the main beam that runs on the optical axis of each fθ lens is reflected by the mirror 8-1 or the mirror 8-2 so as to cross the scan surface axis at a right angle as the beam and the axis are projected onto the beam reflection plane. The beams reflected by the respective mirrors 8-1 and 8-2 are reflected by the respective mirrors 9-1 and 9-2 to turn back in the sub-scan direction, thereby being perpendicular to the scan surface axis S.

FIG. 3 shows an optical system arrangement of FIG. 1 and FIG. 2 in the case where $\theta 1$ and $\gamma 1$ are equal to $\theta 2$ and $\gamma 2$, respectively. The optical system arrangement shown in FIG. 1 and FIG. 2 may be different from that shown in FIG. 3, and may be directed to the case where $\theta 1$ and $\gamma 1$ are not equal to $\theta 2$ and $\gamma 2$, respectively. In such a case, the scan length of the first drawing system is not the same as that of the second drawing system. The angles $\gamma 1$ and $\gamma 2$ are uniquely determined from $\theta 1$ and $\theta 2$, respectively. Also, the scan lengths of the first and second drawing systems are determined from $\theta 1$ and $\theta 2$, respectively. Adjustment of $\theta 1$ and $\theta 2$ to proper angles insures that an effective scan span is set to the maximum.

As described above, the optical scan apparatus for scanning a scan area on the scan surface with two light beams by dividing the scan area into halves in the main scan direction joins together the scan beams of two drawing systems with sufficient accuracy to form a signal scan line. The scan lines of the first and second drawing systems should ideally match the scan surface axis. The optical system arrangement of the first and second drawing systems is adjusted such that the scan beam of each drawing system is exactly on the scan surface axis after assemblage. At the initial stage of use, such adjusted state will be maintained. As temperature rises inside the housing of the image forming apparatus including the optical scan apparatus, or as the deflection means generates heat, the housing of the optical system may suffer thermal expansion, with the position of mirrors and other optical devices being displaced. This results in the scan position of a scan beam of each drawing system being displaced in the sub-scan direction. To cope with this, an error in the scan position needs to be detected and corrected accordingly.

Figure 4:
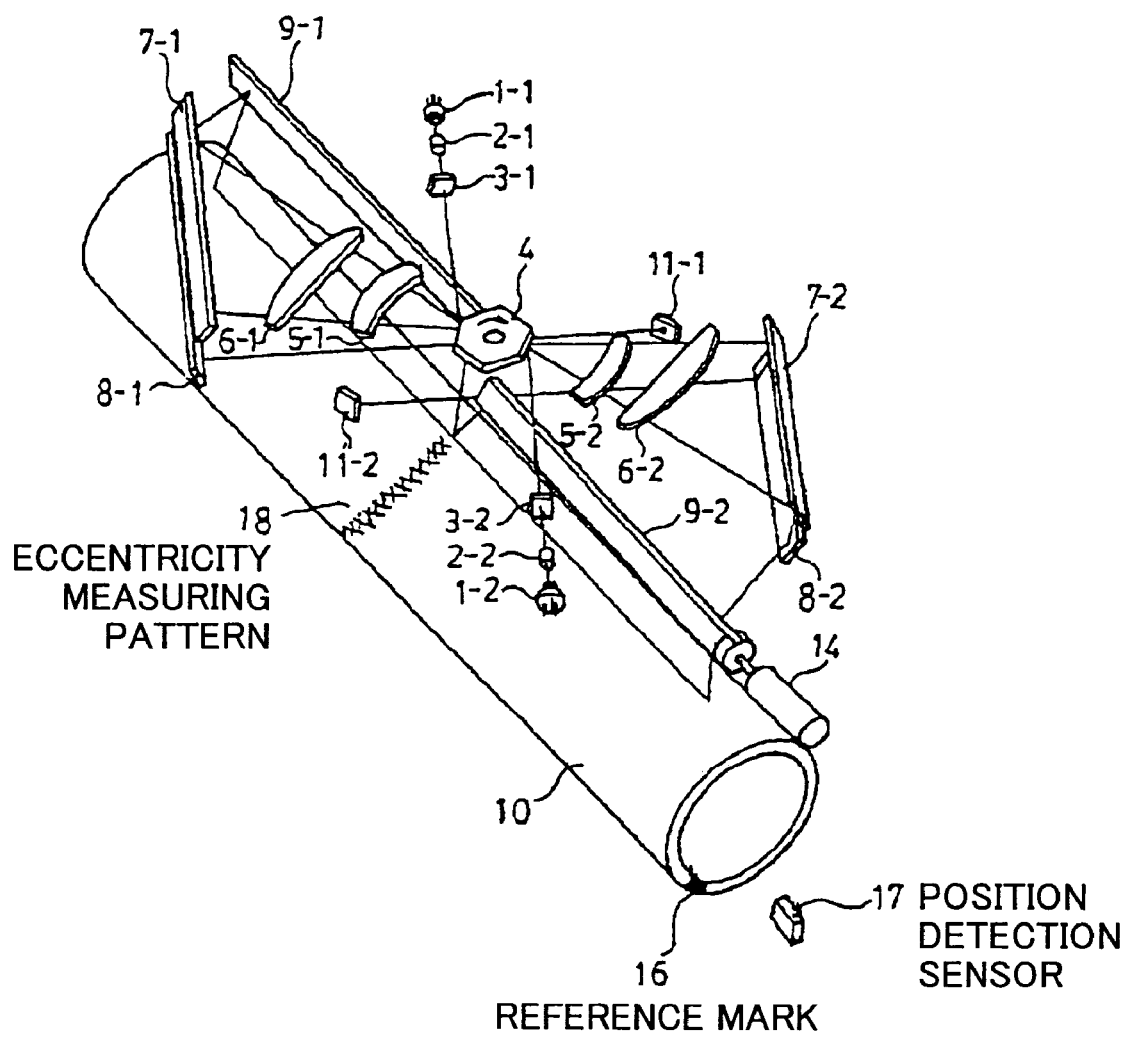
FIG. 4 is a schematic diagram of optical drawing systems.
Figure 5:
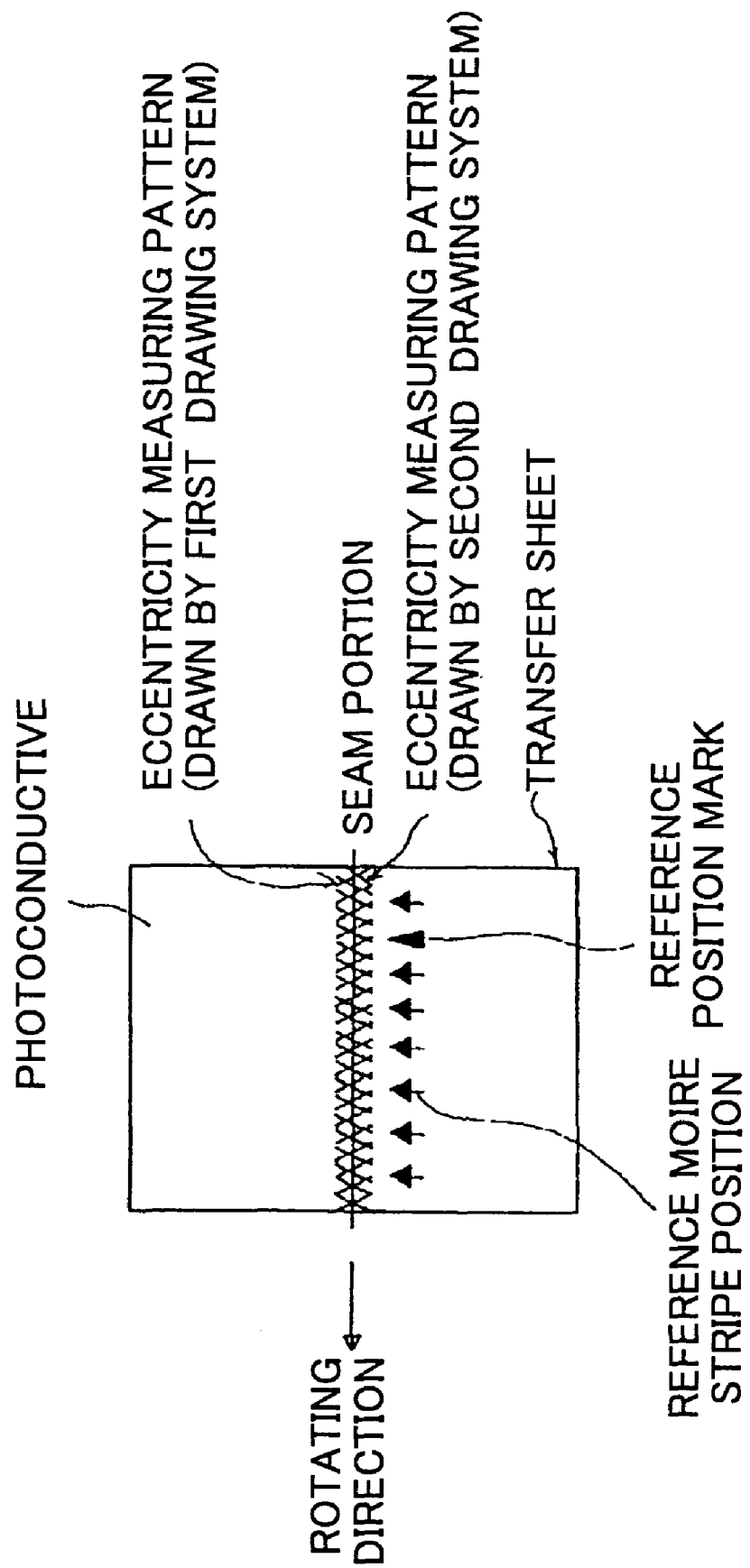
FIG. 5 is an illustrative drawing showing a pattern for measuring eccentricity that is used in the positional alignment of the optical drawing systems.
Figure 6:
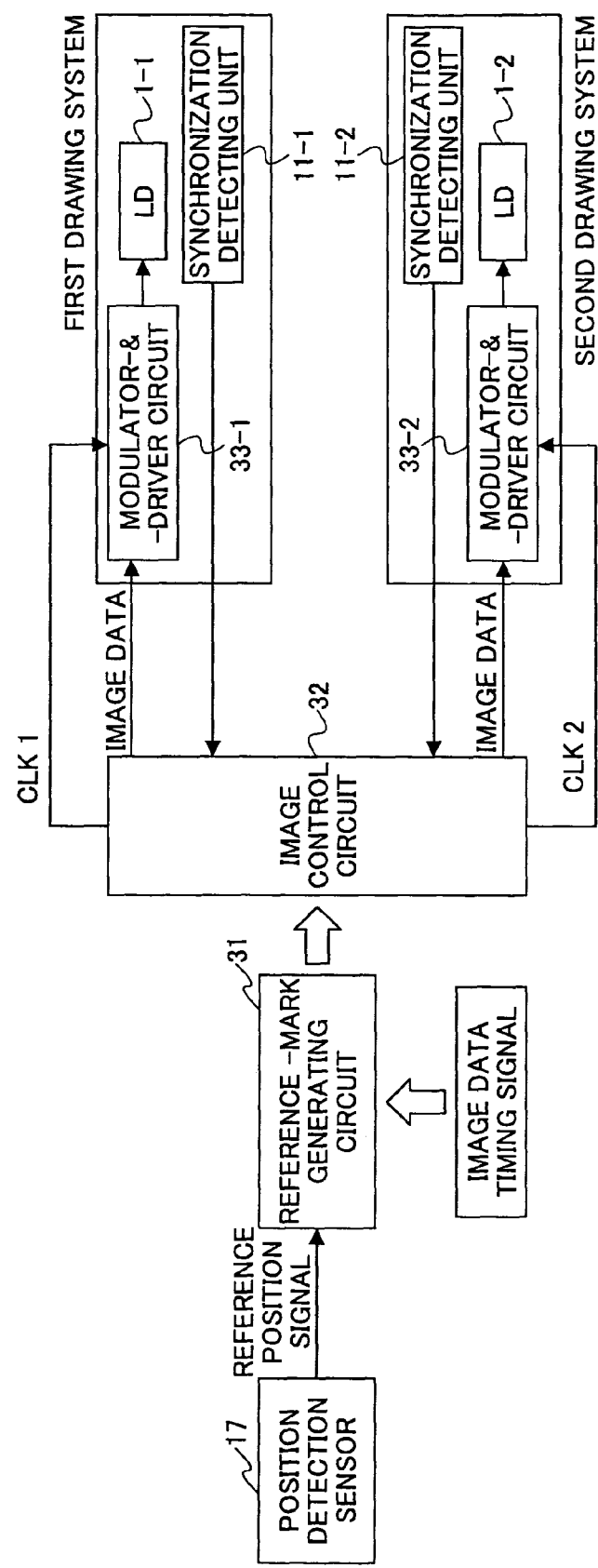
FIG. 6 is a block diagram showing the construction of a circuit for the positional alignment of the optical drawing systems.
Figure 7:
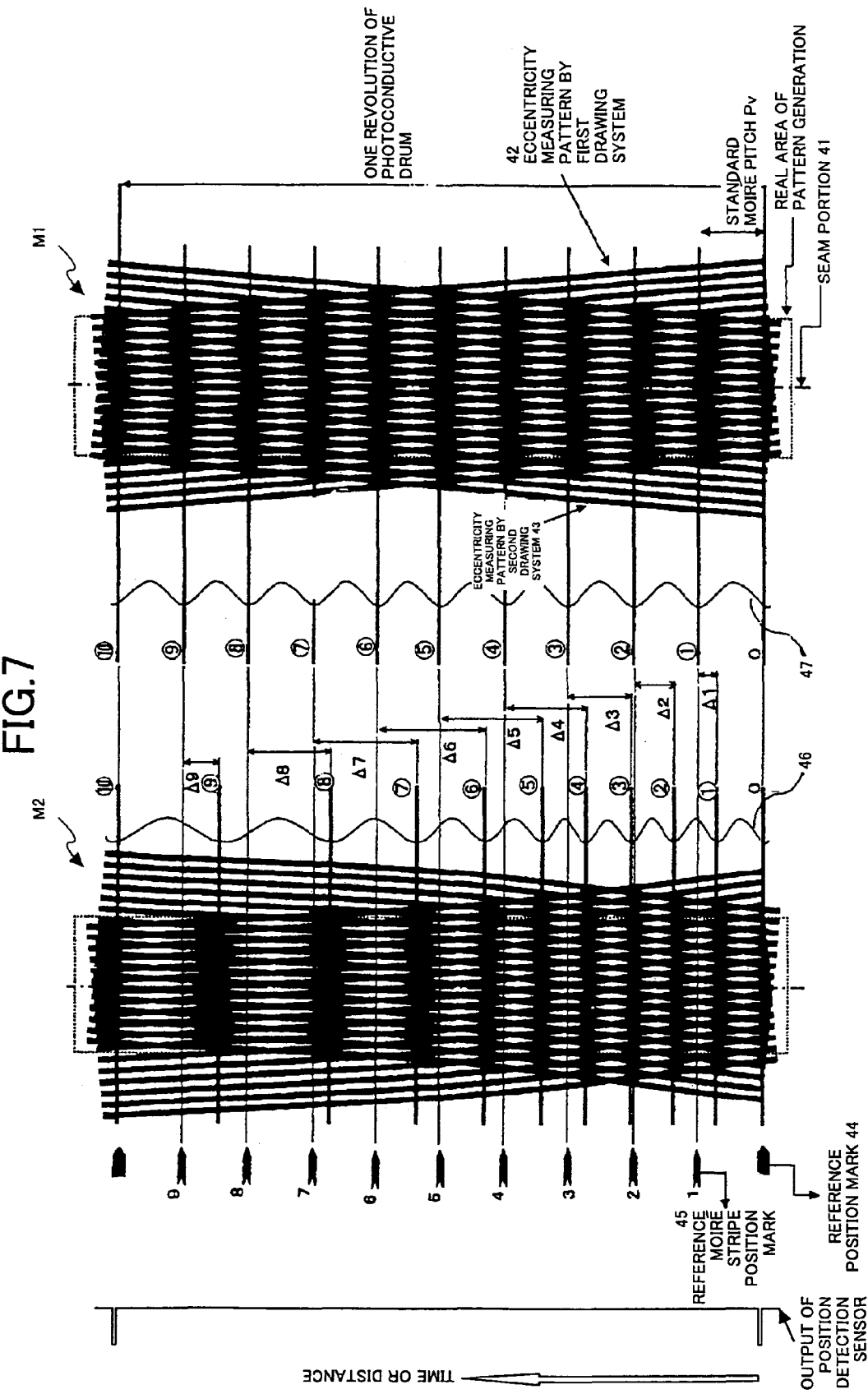
FIG. 7 is an illustrative drawing for explaining moiré patterns appearing on an eccentricity measuring pattern provided on the photoconductive drum.

In the following, a description will be given of a scheme that aligns the start position of light beams where drawing begins according to an embodiment of the invention. FIG. 4 is a schematic diagram of optical drawing systems. FIG. 5 is an illustrative drawing showing a pattern for measuring eccentricity that is used in the positional alignment of the optical drawing systems. FIG. 6 is a block diagram showing the construction of a circuit for the positional alignment of the optical drawing systems. FIG. 7 is an illustrative drawing for explaining moiré patterns appearing on the eccentricity measuring pattern provided on the photoconductive drum.

In FIG. 4, the laser diodes 1-1 and 1-2 of the first and second drawing systems emit laser beams. The laser beams are turned into parallel rays by the collimator lenses 2-1 and 2-2, and cylinder lenses 3-1 and 3-2 converges the light only in the sub-scan direction. The polygon mirror revolves to deflect the beams, which sweep the surface of the photoconductive drum 10 through the fθ lenses 5-1 and 5-2, the fθ lenses 6-1 and 6-2, and the mirrors 7-1, 7-2, 8-1, 8-2, 9-1, and 9-2. The start dots where the first and second drawing systems start drawing are joined together at around the center of the photoconductive drum 10. The scan beams are shone on the synchronization detecting units 11-1 and 11-2, which generate synchronization detecting signals in response. The synchronization detecting signals are used as a reference in generating an image clock.

A reference mark 16 is formed on the photoconductive drum 10. Further, a position detection sensor 17 is provided to detect the reference mark 16 at every revolution. Although the reference mark 16 and the position detection sensor 17 are situated on the side of the photoconductive drum 10, they may be provided at another place instead of the side surface. An encoder for outputting reference position signals may be used. The position detection sensor 17 activates its output once in every revolution of the photoconductive drum 10, as will be described with reference to FIG. 7.

In FIG. 6, a reference position signal output from the position detection sensor 17 is supplied to a reference-mark generating circuit 31, and is superimposed on image data and timing signals supplied from another part of the apparatus. The superimposed image data is then sent to an image control circuit 32.

The image control circuit 32 sends a portion of the image data and a clock signal CLK1 to a modulator-&-driver circuit 33-1, and also sends another portion of the image data and a clock signal CLK2 to a modulator-&-driver circuit 33-2. The modulator-&-driver circuit 33-1 drives the laser diode 1-1 and modulates the intensity of laser light according to the supplied image signal. The modulator-&-driver circuit 33-2 drives the laser diode 1-2 and modulates the intensity of laser light according to the supplied image signal. The image control circuit 32 controls the modulator-&-driver circuits 33-1 and 33-2 in synchronization with signals supplied from the synchronization detecting units 11-1 and 11-2. With this provision, the semiconductor laser diodes 1-1 and 1-2 draw images on the photoconductive drum 10.

As shown in FIG. 7, a reference position mark 44 may be output at the same timing as the reference position signal, or may be output after a fixed time lag since all that is necessary is identifying a phase relationship with the photoconductive drum 10. Here, the reference position mark 44 or an eccentricity measuring pattern 18 (which is shown in FIG. 7, and will later be described) is not output as part of a copier or printer output image (provision is made to stop the outputting of copy data when measuring eccentricity). The reference position mark 44 and the eccentricity measuring pattern 18 are output only when the eccentricity of the photoconductive drum 10 is measured.

The reference-mark generating circuit 31 includes an eccentricity measuring pattern generating circuit and an eccentricity measuring pattern storing circuit, and outputs the eccentricity measuring pattern 18 (i.e., a pattern for creating a moiré pattern on the photoconductive surface) in synchronization with the outputting of the reference position mark 44. The eccentricity measuring pattern 18 is drawn on the photoconductive surface in the same manner as is the reference mark 16. The eccentricity measuring pattern 18 may be stored beforehand in the eccentricity measuring pattern storing circuit, or may be generated by the eccentricity measuring pattern generating circuit.

As shown in FIG. 5, the first drawing system and the second drawing system use respective light beams to create an eccentricity measuring pattern centered at the seam where the light beams join together. Further, the reference position mark 44 is formed in response to the reference position signal from the reference mark 16. Moreover, moiré reference marks are formed on the photoconductive surface to indicate moiré positions that should appear in the case of no eccentricity, which will later be described in detail. The light beams sweep the photoconductive surface, and toner is then attached to create visible images as shown in FIG. 5.

In an example shown in FIG. 5, the seam portion extending in the horizontal direction corresponds to the sub-scan direction, and a vertical direction in the drawing perpendicular to this sub-scan direction is the main scan direction. This embodiment of the invention is aimed at detecting and correcting a displacement of the first and second light beams in the main scan direction that appears at the seam portion due to eccentricity of the photoconductive drum. The moiré reference marks shown in FIG. 5 are used for the purpose of detecting a displacement of light beams at the seam portion.

In the following, FIG. 7 will be described. In FIG. 7, a seam line 41 where the light beams of different drawing systems join together extends through the center of the eccentricity measuring pattern M1. In an example of FIG. 7, the eccentricity measuring pattern M1 is formed by drawing straight lines slanted at opposite angles around the seam line 41 where the first and second drawing systems join together. In this example, some straight lines are slanted at +5 degrees, and the other straight lines are slanted at −5 degrees.

The eccentricity measuring pattern M1 corresponds to a case in which the photoconductive drum 10 has no eccentricity. A pattern 42 is created by the first drawing system by drawing the straight lines slanted at 5 degrees to the left. A pattern 43 is formed by the second drawing system by drawing the straight lines slanted at 5 degrees to the right. For the sake of illustration, the patterns 42 and 43 do not overlap each other at some portions of the drawing. In reality, however, only the portion enclosed in dotted lines is drawn on the photoconductive drum.

The patterns 42 and 43 start appearing before the seam portion 41 (i.e., from a location closer to the synchronization detecting point), and thus overlap each other. If the drawing of each pattern starts 5 mm before the seam portion 41, the overlapping area will have a 10-mm width. An eccentricity measuring pattern M2 in the presence of eccentricity will be described later.

Figure 8:
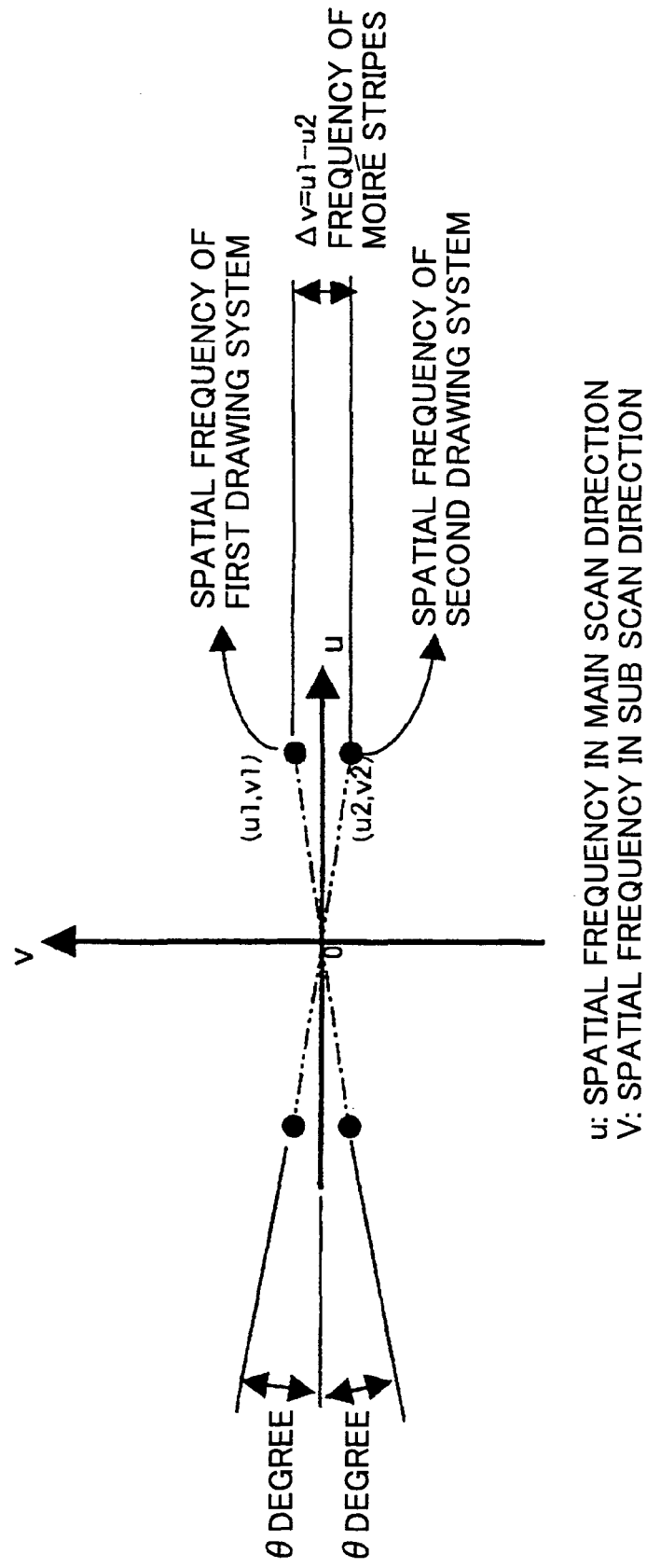
FIG. 8 is an illustrative drawing showing the positional relationship between spatial frequencies of patterns drawn by the first drawing system and the second drawing system.
Figure 9:
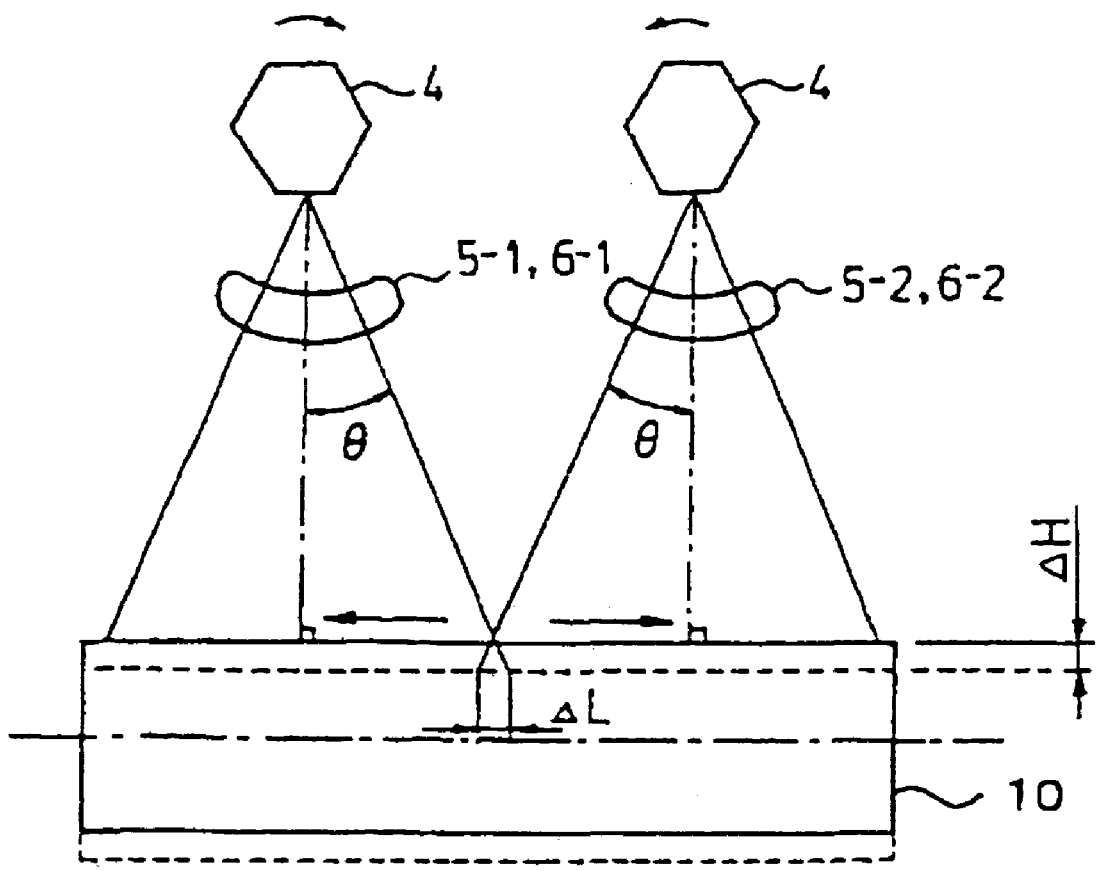
FIG. 9 is an illustrative drawing for explaining the relationship between the eccentricity of the photoconductive drum and a displacement in the main scan direction at the seam portion.
Figure 10:
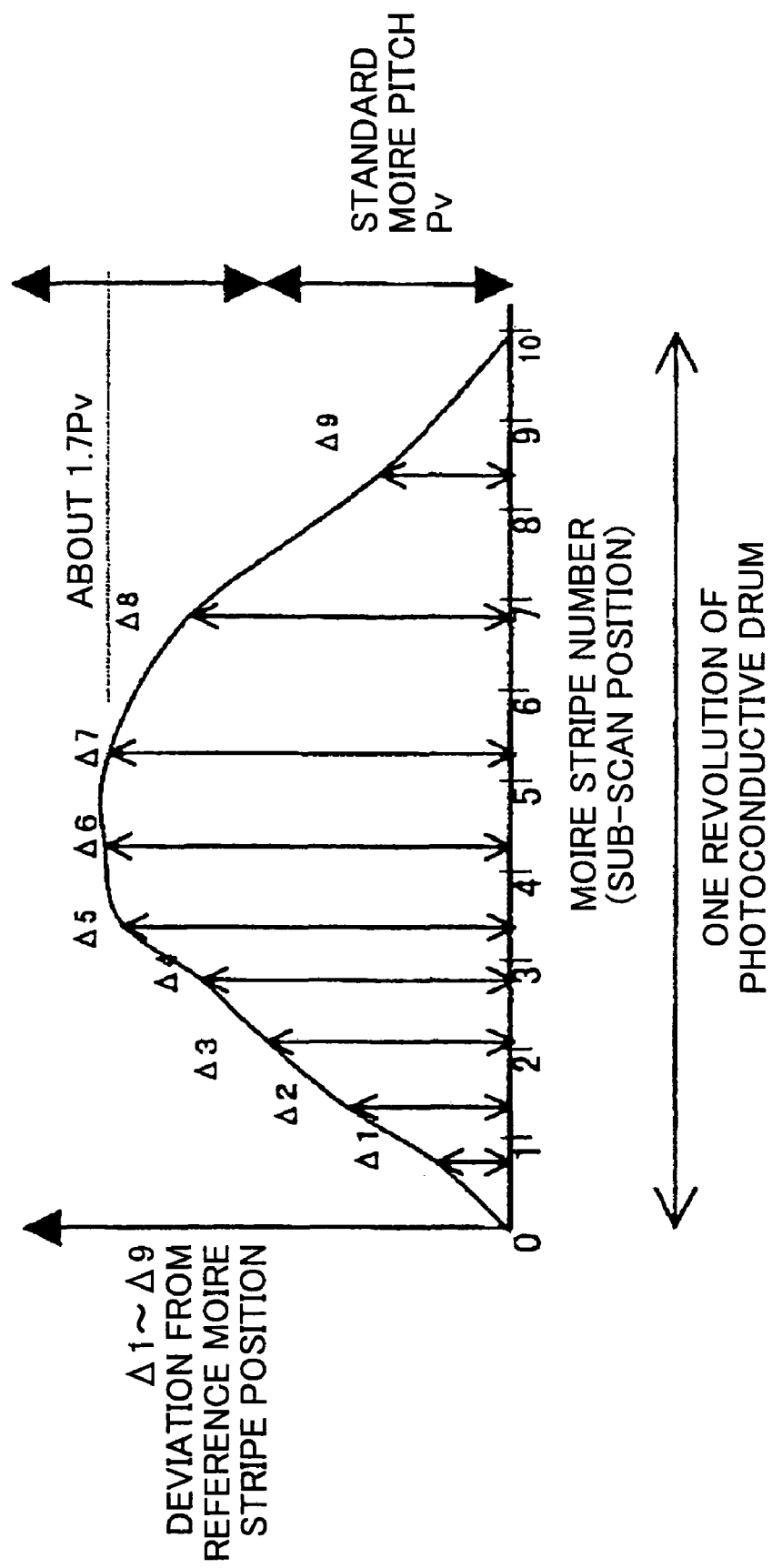
FIG. 10 is a chart showing a displacement of moiré pitches experiencing the eccentricity of the photoconductive drum where such a displacement appears in a sub-scan direction relative to the moiré pitches experiencing no eccentricity.

FIG. 8 is an illustrative drawing showing the positional relationship between spatial frequencies of patterns drawn by the first drawing system and the second drawing system. FIG. 9 is an illustrative drawing for explaining the relationship between the eccentricity of the photoconductive drum and a displacement in the main scan direction at the seam portion. FIG. 10 is a chart showing a displacement of moiré pitches experiencing the eccentricity of the photoconductive drum where such a displacement appears in the sub-scan direction relative to the moiré pitches experiencing no eccentricity.

In FIG. 9, a beam is at an angle θ relative to the photoconductive drum at the seam portion. In the apparatus for aligning the position of drawing systems for the joining of light beams on the photoconductive surface, this angle θ is a maximum incident angle. When the photoconductive drum 10 has an eccentricity ΔH associated with its rotation, the position of images formed by the drawing systems changes, resulting in the displacement of dots in the main scan direction (in the horizontal direction in the drawing). In an example of FIG. 9, a dot displacement ΔL at the seam portion is represented as:

$$\Delta L = 2 \times \Delta H \times \tan \theta$$

where θ is a incident angle of the beam relative to the photoconductive drum at the seam portion, and ΔH is a variation of the photoconductive surface caused by the eccentricity of the photoconductive drum.

If θ is 20 degrees, and ΔH is 100 micrometers, for example, then, ΔL will be 72.8 micrometers. Such an error appears as a white streak or a black streak, degrading image quality. The present invention corrects this error in the main scan direction.

In FIG. 8, the horizontal axis represents the spatial frequency in the main scan direction, and the vertical axis represents the spatial frequency in the sub-scan direction. The spatial frequency in the main scan direction is determined by taking into consideration how easy it is to visually inspect moiré patterns and how easy it is to detect moiré patterns by density sensors or the like. In this example, the spatial frequency in the main scan direction is half the frequency of the image resolution. That is, if the image resolution is 600 DPI, which has 23.6 lines/mm, a spatial frequency u1 is 11.8 lines/mm. A spatial frequency v1 in the sub-scan direction is u1×sin 5° since the lines are slanted at ±5 degrees.

The eccentricity measuring patterns drawn by the first and second drawing systems are slanted at opposite identical angles, a spatial frequency v2 in the sub-scan direction is represented as: v2=−V1. The frequency Fv of the moiré pattern in the sub-scan direction is represented as: Fv=v1−v2=2×v1, and a pitch Pv is represented as: Pv=1/Fv.

A frequency Fu in the main scan direction is given as: Fu=u1−u2=0. The pitch in this case is infinite. That is, the moiré pattern is not at an angle but parallel to the scan line in the main scan direction.

The moiré pattern may be created by using different slant angles. For example, a vertical-line pattern may be used in place of the lines slanted at 5 degrees to the left as shown in FIG. 7. Further, the pattern having lines slanted at 5 degrees to the right as shown in FIG. 7 may be used without any change. In such a case, the moiré pattern will be at an angle to the scan line. That is, the black stripes shown in FIG. 7 would not extend in the horizontal direction, but would be at an angle to the horizontal direction. This makes it difficult to conduct visual inspection, and even if a density sensor is used, an error will be significant. In particular, error will be quite significant when detecting the phase relationship with the reference position marks, depending on the position in the main scan direction where detection is made. In consideration of this, the two slanted patterns may be set at opposite identical angles, so that the black stripes are generated as horizontal lines. In this case, the eccentricity measuring pattern is comprised of sets of lines having an identical pitch, an identical line width, and opposite angles having reversed signs.

In the example of FIG. 7, the eccentricity measuring pattern M1 has 10 moiré stripes (i.e., 10 horizontal black bands) for one revolution of the photoconductive drum 10. The position of the moiré stripes in the case of no eccentricity is marked on the photoconductive drum as reference moiré stripe position marks 45 (shown on the left-hand side of the drawing). These reference marks are drawn in the same manner as is the reference position mark 44.

In FIG. 7, the eccentricity measuring pattern M2 shows moiré stripes when the photoconductive drum has eccentricity. As the photoconductive surface goes farther away from the drawing system due to the eccentricity, the dot positions of the two drawing systems are shifted to get apart from each other as shown in FIG. 9. As a result, the slanted lines that should be straight without eccentricity are bent at the center. The eccentricity measuring pattern M2 shown in FIG. 7 would be comprised of straight lines slanted at 5 degrees over one revolution of the photoconductive drum if there was no eccentricity, but is comprised of lines that are bent during half the revolution starting from the reference position mark 44.

In such a case, the moiré stripes (i.e., the horizontal black bands) are generated at positions deviated from the reference moiré stripe position marks 45, which indicate correct position of moiré stripes. Since a variation caused by eccentricity returns to the initial amount at the end of one revolution of the photoconductive drum 10, the position of moiré stripes is the same for every revolution. Further, the number of moiré stripes for one revolution stays the same with or without eccentricity.

A deviation from the reference moiré stripe position is measured for each moiré stripe (Δ1 through Δ9). In FIG. 10, the position of moiré stripes (i.e., a distance from the reference position mark 44) is plotted against the horizontal axis, and the deviation from the reference moiré stripe position is plotted against the vertical axis. The vertical axis then represents an amount of eccentricity with respect to different points on the photoconductive drum.

According to the nature of moiré stripes, a deviation by one cycle in the main scan direction (corresponding to a distance in the main scan direction from a black line slanted at 5 degrees to the next black line) will result in the moiré stripes moving by one cycle in the sub-scan direction (i.e., the moiré stripes shift in the vertical direction by a distance equal to the pitch of stripes). By using this relationship, a dot shift in the main scan direction can be obtained from a deviation of the moiré stripes from the reference moiré stripe position. In the example of the eccentricity measuring pattern M2 in FIG. 7, if the black lines slanted at 5 degrees to the left are shifted as a whole to the left or to the right by the pitch of the black lines (i.e., shifted in the main scan direction by one cycle), the moiré stripes (black bands) vertically move by one stripe. If the shift of the moiré stripes in the vertical direction is known, a dot shift in the main scan direction will also be known.

Figure 11:
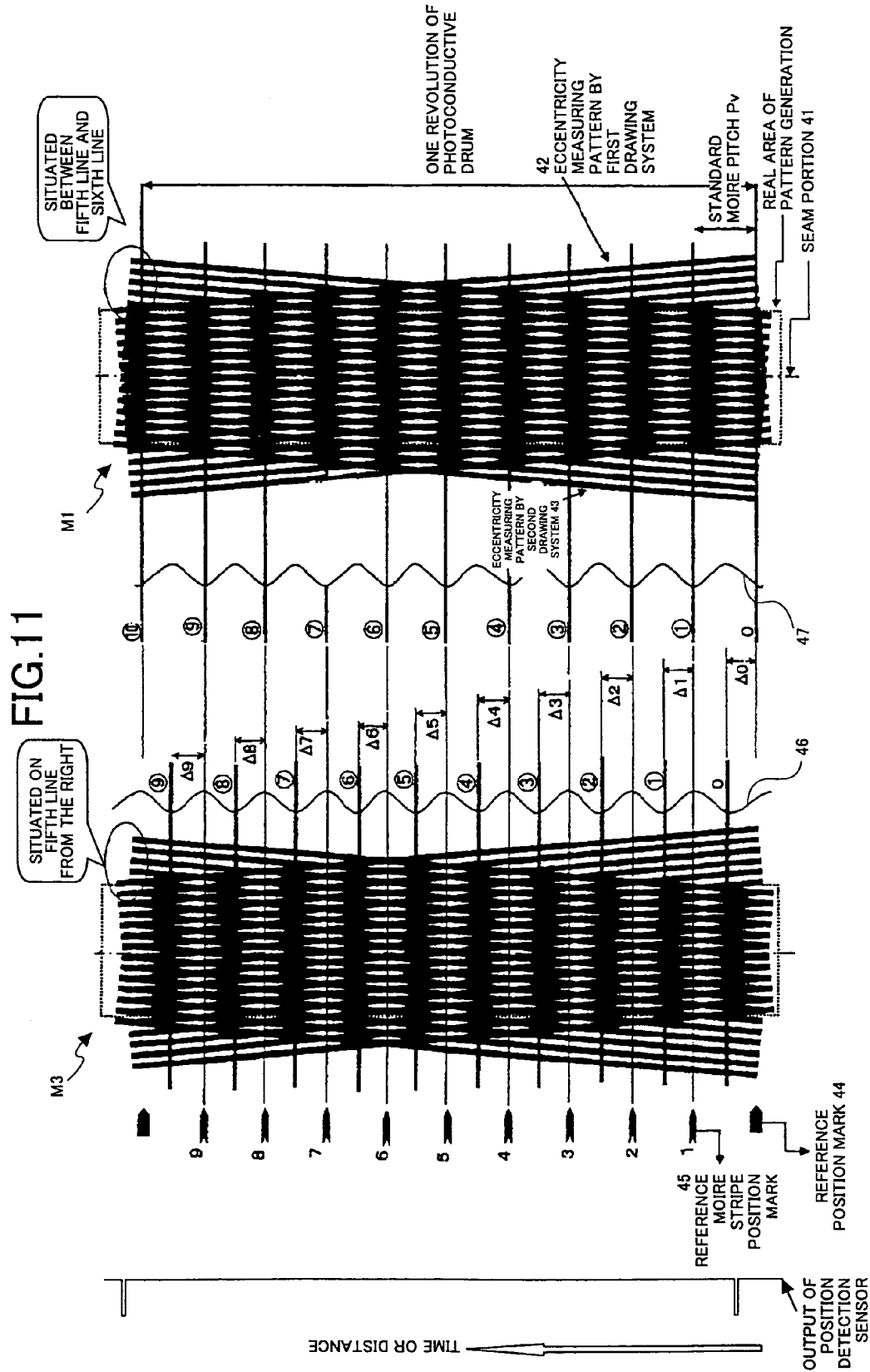
FIG. 11 is an illustrative drawing showing a deviation of moiré stripes from reference positions when black slanted lines are shifted in the main scan direction by half a cycle.

The nature of moiré stripes will further be described. FIG. 11 is an illustrative drawing showing a deviation of moiré stripes from reference positions when the black slanted lines are shifted in the main scan direction by half a cycle. In detail, the eccentricity measuring pattern M1 is the same as that shown in FIG. 7, and corresponds to the case where no eccentricity of the photoconductive drum is present. In the eccentricity measuring pattern M1, the rightmost line of the lines slanted at 5 degrees to the left is situated between the fifth line and the sixth line of the lines slanted at 5 degrees to the right.

A eccentricity measuring pattern M3 shown in FIG. 11 corresponds to a case where the photoconductive drum has eccentricity. The rightmost line of the lines slanted at 5 degrees to the left is situated on the fifth line of the lines slanted at 5 degrees to the right. Namely, the eccentricity measuring pattern M3 is displaced (due to eccentricity) in the main scan direction by half a cycle compared with the eccentricity measuring pattern M1. With this half-a-cycle displacement, the moiré stripes of the pattern M3 shift downwards by half a standard moiré pitch Pv. In this manner, the shift of moiré stripes in the vertical direction is associated with a displacement in the main scan direction. Specifically, the shift of moiré stripes by 0.5 Pv corresponds to a displacement in the main scan direction by 0.5 cycle.

In the example of the eccentricity measuring pattern M2 shown in FIG. 7, the seventh moiré stripe deviates from the reference moiré stripe position mark 45 by 1.7 Pv (Pv=standard moiré pitch) (see FIG. 10). This means that a displacement in the main scan direction is 1.7 cycle, which corresponds to 3.4 dots. Since one cycle of the black slanted lines is comprised of a black line, a white line, and a black line, and spans over two dots in the main scan direction, twice a moiré cycle shift represents a dot shift in the main scan direction. That is, the dot shift in the main scan direction is equal to 2× a cycle displacement in the main scan direction.

In summary, the moiré stripes appearing with toner attached on the photoconductive drum or on a paper sheet is inspected to measure a deviation of moiré stripes from standard positions over one revolution of the photoconductive drum, and a dot shift in the main scan direction is then obtained from the moiré deviation.

In this manner, a dot shift (ΔL in FIG. 9) in the main scan direction or an eccentricity (ΔH in FIG. 9) of the photoconductive drum is obtained by inspecting or measuring the toner pattern on the photoconductive drum or the pattern transferred onto the paper sheet. The shift in the main scan direction or the eccentricity is then stored in an eccentricity storing unit 81 shown in FIG. 12 by entering eccentricity data through operation unit.

Figure 12:
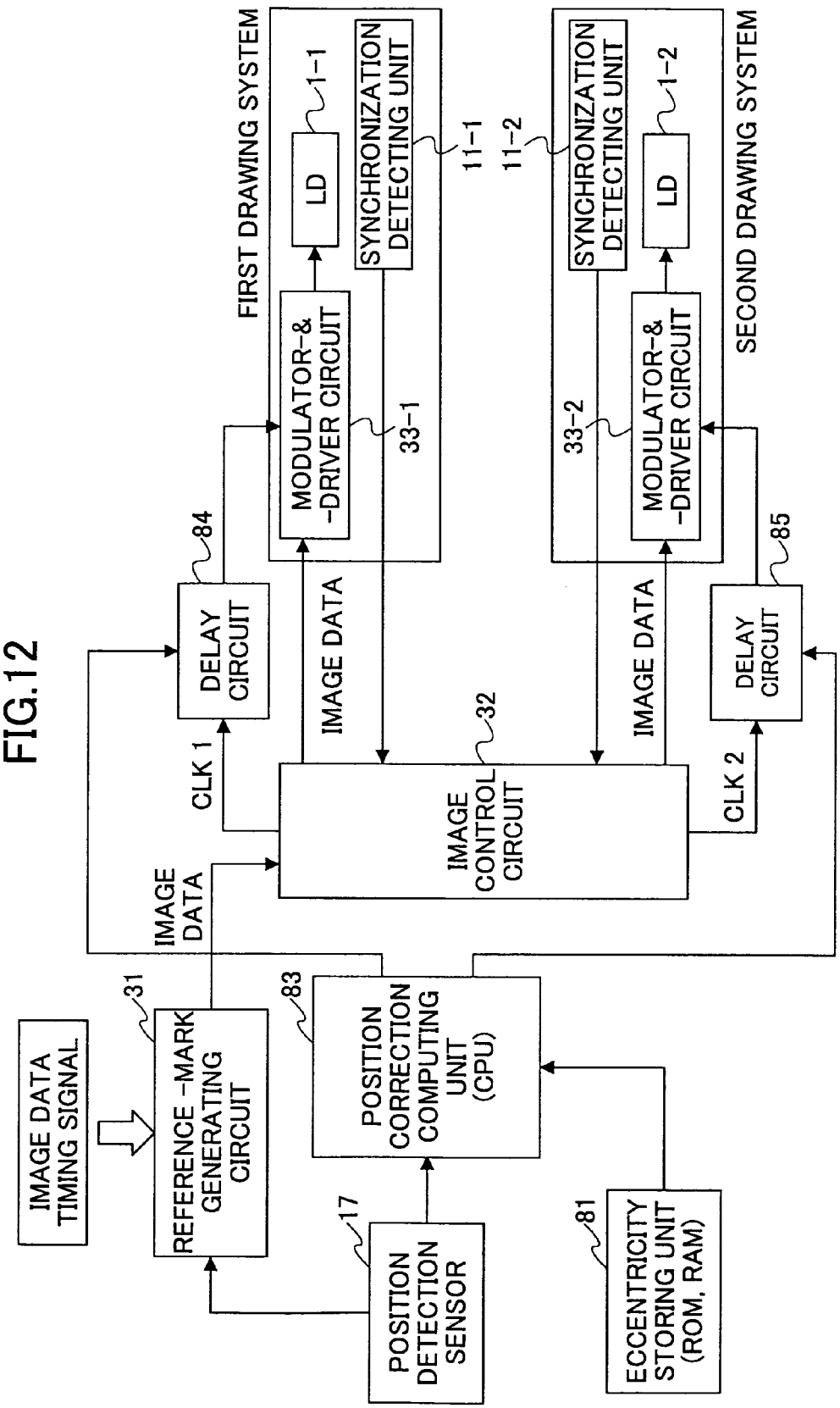
FIG. 12 is a block diagram showing an example of a circuit for the positional alignment of the optical drawing systems.

Based on the eccentricity (or displacement in the main scan direction) stored in the eccentricity storing unit 81, the dot position in the main scan direction is corrected in accordance with the rotation of the photoconductive drum, thereby creating an image having no dot displacement in the main scan direction. Various methods may be used to correct dot position in the main scan direction. As shown in FIG. 12, for example, a position correction computing unit 83 computes the amount of correction that is necessary based on the data stored in the eccentricity storing unit 81, and controls the delay of delay circuits 84 and 85 according to the computed correction amounts. The delays are controlled with respect to the clock signals CLK1 and CLK2 supplied to the modulator-&-driver circuits 33-1 and 33-2, thereby correcting the timing at which each beam starts drawing in the main scan direction.

Figure 13:
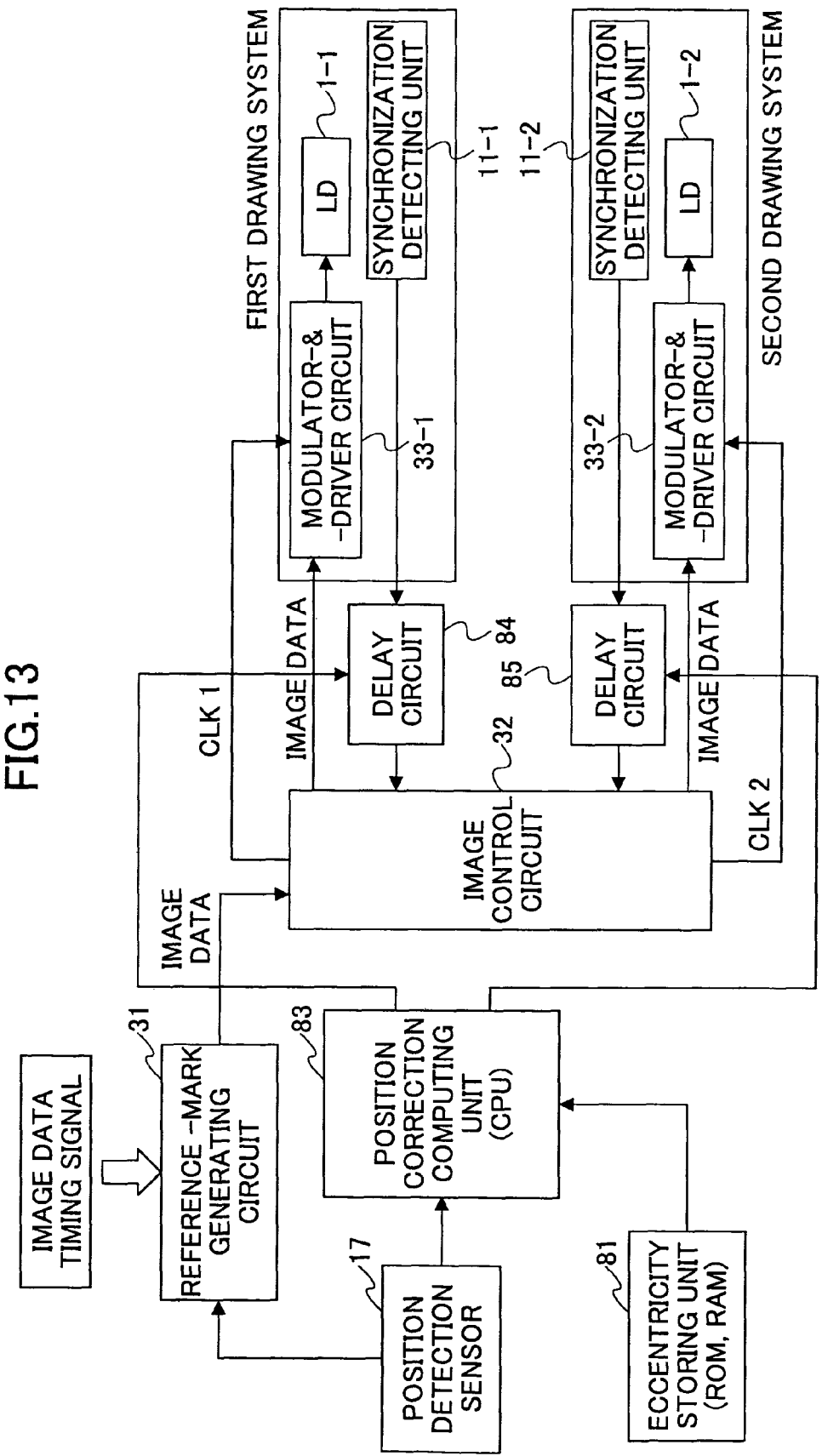
FIG. 13 is a block diagram showing another example of a circuit for the positional alignment of the optical drawing systems.

Alternatively, as shown in FIG. 13, the delay circuits 84 and 85 may be placed between the image control circuit 32 and the synchronization detecting units 11-1 and 11-2, respectively. The delays of the delay circuits 84 and 85 are controlled so as to correct the timing at which each beam starts drawing in the main scan direction.

In the following, a description will be given of a configuration that detects the eccentricity of the photoconductive drum (i.e., a displacement in the main scan direction) according to the embodiment of the invention. In order to detects the image density of the eccentricity measuring pattern 18 formed on the photoconductive drum, a density sensor is provided near the seam portion in such a manner as to face the photoconductive surface. The density sensor detects the density of the eccentricity measuring pattern 18 created by the overlapping of the first and second light beams along the circumference of the drum. Based on this detection, a deviation from the reference moiré stripe position marks is measured.

The density sensor is provided to replace the visual inspection of a photoconductive drum or a paper sheet for determining an eccentricity or a displacement in the main scan direction. That is, the density of the eccentricity measuring pattern is directly measured on the photoconductive drum to automatically determine an eccentricity or a displacement in the main scan direction.

In FIG. 7, the output of the density sensor is shown as output waveforms 46 and 47 as measurement is taken along the circumference of the photoconductive drum. The output waveform 47 corresponds to a case where no eccentricity is present, and the output waveform 46 corresponds to a case where the photoconductive drum has eccentricity. The output changes according to the density of moiré stripes, so that the position of the moiré stripes is determined by identifying a high peak position or a low peak position. In the case of the output waveform 47 without eccentricity, the peak positions are provided at equal intervals, whereas the output waveform 46 with eccentricity has peaks at deviated positions compared with the output waveform 47. Such deviation measured by the density sensor is the same as the deviation of the moiré stripes described above.

Figure 14:
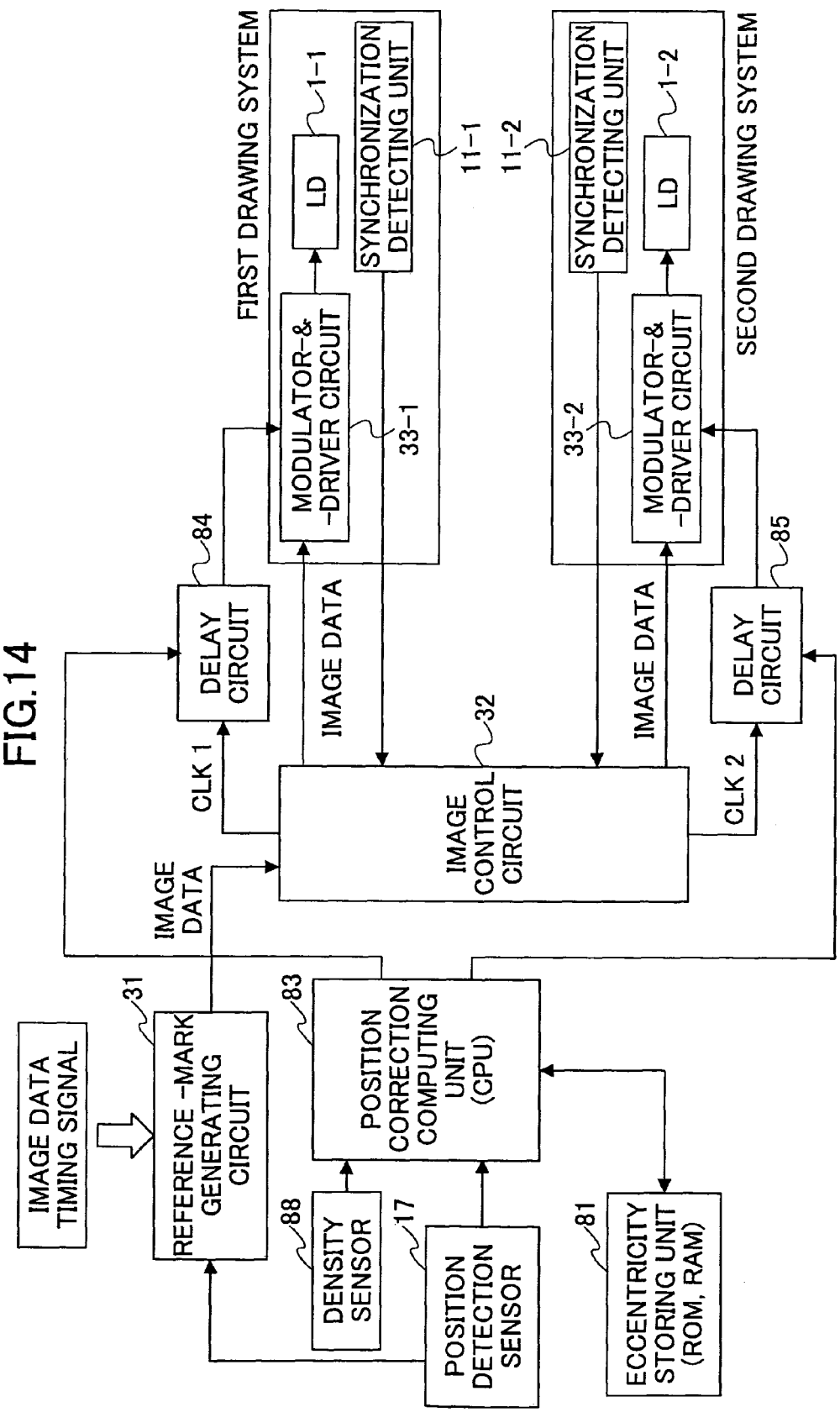
FIG. 14 is a block diagram showing a further example of a circuit for the positional alignment of the optical drawing systems.

In FIG. 14, the output of a density sensor 88 is supplied to the position correction computing unit 83. The position correction computing unit 83 obtains peak positions in the outputs of the density sensor, and computes a dot shift in the main scan direction resulting from eccentricity by determining a difference between the obtained peak positions and the ideal peak positions without no eccentricity (such ideal peak positions can be computed from the pattern arrangement and the pitch).

A dot shift in the main scan direction and an eccentricity is related as: $\Delta L = 2 \times \Delta H \times \tan \theta$ as was described in connection with FIG. 9. The dot shift in the main scan direction or the eccentricity is stored in the eccentricity storing unit 81. The correction of a position where drawing starts in the main scan direction is made by controlling the delays of clock signals for driving the semiconductor laser as shown in FIG. 14 or by controlling the delays of synchronization detecting signals as shown in FIG. 13.

As a variation of the embodiment, the eccentricity of the photoconductive drum obtained by inspecting or measuring the moiré stripes may be represented by data at three points along one revolution of the photoconductive drum, and three data values are stored in memory. Interpolation by use of a spline, a polynomial, a sinusoidal, or the like may be used to compute an eccentricity at points other than the three points. Such computation may be done by the position correction computing unit 83 shown in FIG. 12 through FIG. 14. Other operations are the same as those of the embodiment described above.

A displacement in the main scan direction resulting from the eccentricity of a photoconductive drum may be detected at the time of exchange of photoconductive drums or at the time of power on of the image forming apparatus. Also, detection may be made when the temperature of the apparatus has changed more than a predetermined amount since the last detection. A temperature sensor may be provided in this case. Further, detection may be made when a predetermined time period passes since the last detection. After detecting a displacement in the main scan direction, the correction of displacement may be made by using the detected displacement as it is. Alternatively, the latest data may be compared with the preceding data, and a check may be made as to whether the difference falls within a tolerable range, followed by updating the data if the difference falls outside the tolerable range.

Further, the present invention is not limited to these embodiments, but various variations and modifications may be made without departing from the scope of the present invention.

The present application is based on Japanese priority application No. 2002-276559 filed on Sep. 24, 2002, with the Japanese Patent Office, the entire contents of which are hereby incorporated by reference.

What is claimed is:

1. An apparatus for forming an image by use of a plurality of light beams, which are simultaneously modulated according to image signals and joined together on a photoconductive surface to form the image, comprising:
   a photoconductive drum having a photoconductive surface and a reference mark;
   a pattern supplying unit configured to supply image data in synchronization with detection of the reference mark associated with rotation of the photoconductive drum; and
   drawing systems configured to create moiré stripes on the photoconductive surface by simultaneously drawing overlapping sets of slanted lines with the respective light beams according to the image data, and draw reference position marks alongside the moiré stripes, on the photoconductive surface according to the image data.

2. The apparatus as claimed in claim 1, further comprising a computing unit which computes an amount of correction of position of the light beams on the photoconductive surface in a main scan direction in response to a comparison between positions of the moiré stripes and positions of the reference position marks, the main scan direction being substantially parallel to an axis of the photoconductive drum.

3. The apparatus as claimed in claim 2, further comprising a sensor which detects the position of the moiré stripes.

4. The apparatus as claimed in claim 2, wherein said computing unit computes the amount of correction of position of the light beams by interpolating data that are obtained for at least three positions along a circumference of the photoconductive drum.

5. The apparatus as claimed in claim 2, wherein said comparison is made either on the photoconductive surface or on a sheet of paper on which a toner image of the moiré stripes and the reference position marks are created.

6. The apparatus as claimed in claim 1, further comprising a circuit which adjusts position of the light beams on the photoconductive surface in a main scan direction according to comparison between positions of the moiré stripes and positions of the reference position marks, the main scan direction being substantially parallel to an axis of the photoconductive drum.

7. The apparatus as claimed in claim 1, wherein said drawing systems include:
   a first drawing system which uses a first one of the light beams to draw a first set of lines slanted at a predetermined angle; and
   a second drawing system which uses a second one of the light beams to draw a second set of lines slanted at an angle opposite to the predetermined angle, said first set of lines and said second set of lines having an identical line pitch and an identical line width.

8. An apparatus for adjusting positions of a plurality of light beams, which are simultaneously modulated according to image signals and joined together on a photoconductive surface to form an image, comprising:
   a photoconductive drum having the photoconductive surface and a reference mark;
   a pattern supplying unit configured to supply image data in synchronization with a detection of a reference mark associated with a rotation of the photoconductive drum;
   drawing systems configured to create moiré stripes on the photoconductive surface by simultaneously drawing overlapping sets of slanted lines with the respective light beams according to the image data, and draw reference position marks alongside the moiré stripes, on the photoconductive surface according to the image data; and
   a circuit configured to adjust positions of the light beams on the photoconductive surface in a main scan direction according to a comparison between a position of the moiré stripes and a position of the reference position marks, the main scan direction being substantially parallel to an axis of the photoconductive drum.

9. An apparatus for forming an image by use of a plurality of light beams, which are simultaneously modulated according to image signals and joined together on a photoconductive drum to form the image, comprising:
   means for forming reference position marks on the photoconductive drum; and
   means for forming moiré stripes alongside the reference position marks on the photoconductive drum by simultaneously drawing overlapping sets of slanted lines with the respective light beams.

10. The apparatus as claimed in claim 9, further comprising computing means for computing an amount of correction of position of the light beams on the photoconductive drum in a main scan direction in response to a comparison between positions of the moiré stripes and positions of the reference position marks, the main scan direction being substantially parallel to an axis of the photoconductive drum.

11. The apparatus as claimed in claim 10, further comprising means for detecting the position of the moiré stripes.

12. The apparatus as claimed in claim 10, wherein said computing means computes the amount of correction of position of the light beams by interpolating data that are obtained for at least three positions along a circumference of the photoconductive drum.

13. The apparatus as claimed in claim 10, wherein said comparison is made either on the photoconductive surface or on a sheet of paper on which a toner image of the moiré stripes and the reference position marks are created.

14. The apparatus as claimed in claim 9, further comprising means for adjusting position of the light beams on the photoconductive drum in a main scan direction according to a comparison between positions of the moiré stripes and positions of the reference position mark, the main scan direction being substantially parallel to an axis of the photoconductive drum.

15. The apparatus as claimed in claim 9, wherein said means for forming moiré stripes include:
   a first drawing system which uses a first one of the light beams to draw a first set of lines slanted at a predetermined angle; and
   a second drawing system which uses a second one of the light beams to draw a second set of lines slanted at an angle opposite to the predetermined angle, said first set of lines and said second set of lines having an identical line pitch and an identical line width.

16. An apparatus for adjusting positions of a plurality of light beams, which are simultaneously modulated according to image signals and joined together on a photoconductive drum to form an image, comprising:

means for forming reference position marks on the photoconductive drum;

means for forming moiré stripes alongside the reference position marks on the photoconductive drum by simultaneously drawing overlapping sets of slanted lines with the respective light beams; and means for adjusting the positions of the light beams on the photoconductive drum in a main scan direction according to a comparison between a position of the moiré stripes and a position of the reference position marks, the main scan direction being substantially parallel to an axis of the photoconductive drum.

* * * * *